(12) United States Patent
Hiza et al.

(10) Patent No.: US 7,810,421 B2
(45) Date of Patent: Oct. 12, 2010

(54) METHODS OF PREVENTING INITIATION OF EXPLOSIVE DEVICES

(75) Inventors: Sarah B. Hiza, North Ogden, UT (US);
Daniel W. Doll, Marriott Slaterville, UT (US); Jared K. Olson, North Ogden, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 12/020,491

(22) Filed: Jan. 25, 2008

(65) Prior Publication Data

US 2009/0188379 A1 Jul. 30, 2009

(51) Int. Cl.
*B64D 1/04* (2006.01)
(52) U.S. Cl. .................. 89/1.13; 102/401; 102/364; 102/365; 89/1.14; 89/28.05
(58) Field of Classification Search .................. None
See application file for complete search history.

(56) References Cited

U.S. PATENT DOCUMENTS

| | | | | |
|---|---|---|---|---|
| 2,835,330 | A * | 5/1958 | Bauer | 169/44 |
| 3,638,569 | A | 2/1972 | Messerschmitt-Bolkow | |
| 4,196,668 | A * | 4/1980 | Morlock et al. | 102/473 |
| 4,202,279 | A | 5/1980 | Rand | |
| 4,237,182 | A * | 12/1980 | Fulmer et al. | 428/305.5 |
| 5,142,986 | A * | 9/1992 | Gundel | 102/401 |
| 5,192,607 | A | 3/1993 | Soukup | |
| 5,719,501 | A * | 2/1998 | Spektor et al. | 324/345 |
| 6,007,905 | A | 12/1999 | Kudo et al. | |
| 6,074,475 | A * | 6/2000 | Harrison et al. | 106/605 |
| 6,110,982 | A | 8/2000 | Russick et al. | |
| 6,202,531 | B1 * | 3/2001 | Comeyne | 89/1.13 |
| 6,245,434 | B1 * | 6/2001 | Shinozaki et al. | 428/472 |
| 6,363,854 | B1 * | 4/2002 | Schweitzer | 102/401 |
| 6,405,626 | B1 | 6/2002 | Bureaux et al. | |
| 6,553,887 | B1 | 4/2003 | Bureaux et al. | |
| 7,118,693 | B2 | 10/2006 | Glatkowski et al. | |
| 7,130,624 | B1 | 10/2006 | Jackson et al. | |
| 7,136,008 | B2 | 11/2006 | Aisenbrey | |
| 7,196,655 | B1 * | 3/2007 | Hayles et al. | 342/45 |
| 7,467,579 | B1 * | 12/2008 | Portmann | 89/1.13 |
| 7,484,447 | B1 * | 2/2009 | Portmann | 89/1.13 |
| 7,642,948 | B2 * | 1/2010 | Schwaab et al. | 342/1 |
| 2002/0096039 | A1 * | 7/2002 | Anderson | 89/1.13 |
| 2003/0213939 | A1 | 11/2003 | Narayan et al. | |

(Continued)

OTHER PUBLICATIONS

Fickes, Michael, "Stuck on Security," Government Security, Technology Solutions in Defense of the Homeland, © 2007, Primedia Business Magazines and Media, 2 pages, Feb. 1, 2004.

(Continued)

*Primary Examiner*—Troy Chambers
*Assistant Examiner*—Samir Abdosh
(74) *Attorney, Agent, or Firm*—TraskBritt

(57) ABSTRACT

A method of preventing initiation of an explosive device. The method comprises substantially encasing an explosive device with a conductive foam. The explosive device is configured to be initiated by an electromagnetic radiation signal, such as that emitted by a transmitter of a wireless door bell device. Deactivated explosive devices are also disclosed.

19 Claims, 3 Drawing Sheets

U.S. PATENT DOCUMENTS

2005/0223881 A1* 10/2005 Cirillo ............................ 86/50
2006/0011054 A1   1/2006 Walthall, III et al.
2009/0223355 A1*  9/2009 Manders ..................... 89/1.13

OTHER PUBLICATIONS

Scott, Steven H., "Sticky Foam As A Less-Than-Letal Technology," Sandia National Laboratory, Albuquerque, New Mexico, 8 pages, no date.

Sirak, Michael, "ATK Unveils Counter UAV Systems As Part of Growing Portfolio," Defense Daily, vol. 235, Issue 36, Aug. 21, 2007, pp. 2-3.

Definition of "encase" from the Merriam-Webster Online Dictionary, http://www.merriam-webster.com/dictionary/encase, printed Oct. 1, 2009, 1 page.

* cited by examiner

METHODS OF PREVENTING INITIATION OF EXPLOSIVE DEVICES

TECHNICAL FIELD

The present invention relates to disrupting electromagnetic radiation and, more specifically, to deactivating explosive devices that are initiated by electromagnetic radiation by applying a conductive foam thereto.

BACKGROUND

Remote detonation of an explosive device has become an increasingly common tactic used by terrorist organizations and other criminals. Deactivation of these explosive devices is difficult because the explosive device is typically hidden from view and is under constant surveillance by an individual capable of remotely detonating the explosive device. Therefore, these explosive devices pose a significant threat to military and law enforcement personnel.

United States Patent Application Publication No. 2006011054 to Walthall, III et al. discloses a flexible shield that protects against remote detonation of an explosive device. The flexible shield includes a radiofrequency ("RF") shielding layer and a ballistic control layer. The RF shielding layer includes a conductive fabric, such as a copper/nickel coated polyester woven fabric, upon which a flexible conductive coating is applied. The flexible conductive coating includes an emulsion polymer binder and electrically conductive particles. The ballistic control layer is a multi-layer material formed of non-woven and woven ballistic materials. The flexible shield is portable and is placed over the explosive device.

U.S. Patent Application Publication No. 20030213939 to Narayan discloses an electrically conductive polymer foam structure that includes carbon nanotubes. The foam structure is produced as a sheet, tube, conduit, slab, or mesh. Articles, such as gaskets, formed from the electrically conductive polymer foam provide electromagnetic shielding to electronic devices. The articles are soft and compressible.

So-called "sticky foams" have also been used to impair or restrain an individual. The sticky foam is fired at the individual from a dispenser or gun. As disclosed in U.S. Pat. No. 4,202,279 to Rand, the foam is generated from a tacky polymeric resin and a low boiling point solvent. Suggested uses of the sticky foam include preventing unauthorized access to nuclear or other secure facilities and restraining individuals in prison or other law enforcement facilities.

BRIEF SUMMARY OF THE INVENTION

An embodiment of the present invention relates to a method of preventing initiation of an explosive device configured to be initiated by an electromagnetic signal, such as may be emitted by a transmitter. The method comprises applying a conductive foam to the electromagnetically actuable explosive device.

The present invention also relates to a method of preventing initiation of an explosive device that comprises substantially encasing an explosive device with a conductive foam.

The present invention also relates to a deactivated explosive device that comprises an explosive device configured to be initiated by an electromagnetic radiation signal. A conductive foam is disposed over at least a substantial portion of the explosive device.

The present invention also relates to a deactivated explosive device that comprises an explosive device substantially encased by a conductive foam. The explosive device is configured to be initiated by electromagnetic radiation.

The present invention also relates to a method of preventing initiation of an explosive device. The method comprises spraying a conductive foam on an explosive device to disrupt communication between the explosive device and a detonation device thereof.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
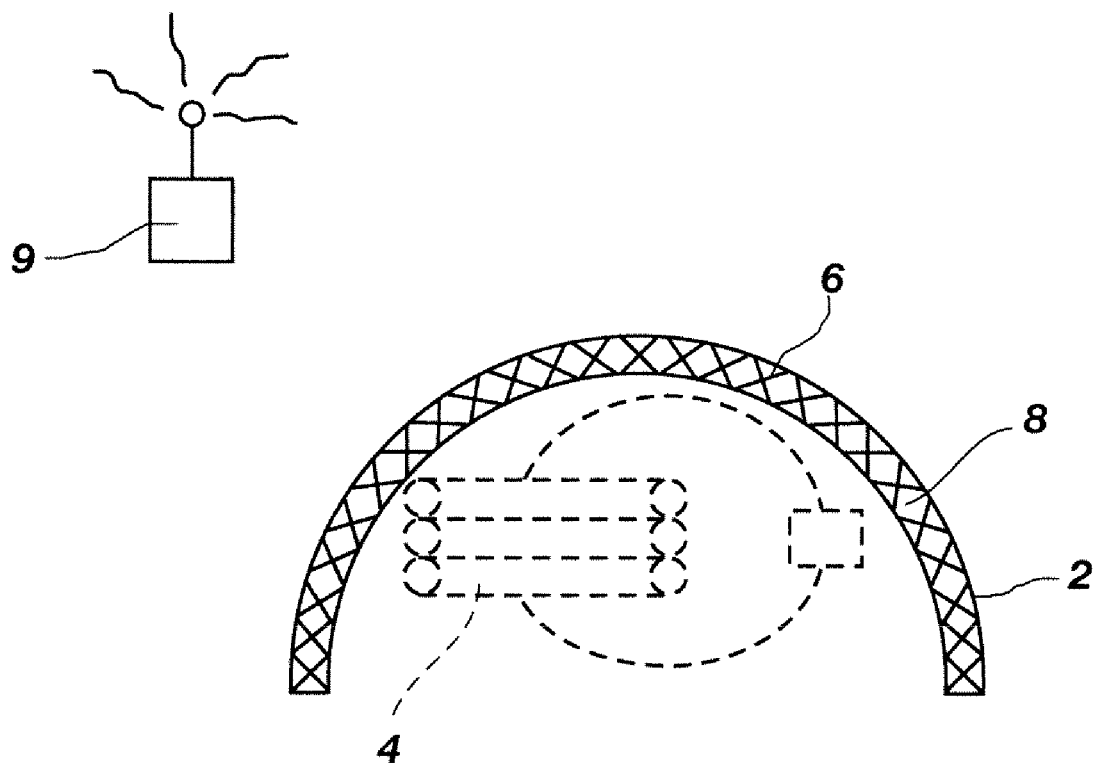
FIG. 1 is a schematic illustration of an explosive device encased by a conductive foam according to the present invention.

A conductive foam for deactivating or disabling an explosive device is disclosed. When applied to the explosive device, the conductive foam is formulated or configured to prevent electromagnetic radiation from actuating or triggering the explosive device. The conductive foam forms a coating over, or otherwise substantially encapsulates, the explosive device. The conductive foam may disrupt or disable communication between a detonation device comprising a transmitter configure to emit electromagnetic radiation and the explosive device, which includes a receiver. The conductive foam may be applied to the explosive device or to an object in which the explosive device is concealed by various techniques, such as by spraying, pouring, injecting, or otherwise coating the explosive device or the object in which the explosive device is concealed with the conductive foam. While the conductive foam may be sprayed onto the explosive device or the object in which the explosive device is concealed, other methods of applying the conductive foam may be used. The conductive foam is applied to the explosive device using a dispensing device.

As used herein, the term "explosive device" means and includes a device that includes an explosive material and is operated, actuated, or initiated by electromagnetic radiation. As used herein, the term "electromagnetic radiation" means and includes radiofrequency ("RF"), microwave, infrared ("IR"), visible, ultraviolet ("UV"), x-ray, or gamma ray radiation, or combinations thereof. The explosive device may be actuated by electromagnetic radiation within a range of from approximately 30 MHz to approximately 3 GHz. The explosive device may include a package or housing that contains the explosive material, an electronic detonator to ignite the explosive material, an electromagnetically actuated switch, which may be characterized as the receiver, to trigger the electronic detonator, and at least one power source, such as at least one battery, to power electrical components in the explosive device. The explosive material may include a conventional pyrotechnic, incendiary, or propellant material, or combinations thereof. Alternatively, the explosive material may include a conventional pyrotechnic, incendiary, or propellant material, or combinations thereof, used in conjunction with another material(s), such as a biological or chemical warfare agent or a radioactive material, that would be dispersed or initiated by the pyrotechnic, incendiary, or propellant material, or combinations thereof. While the Examples herein describe explosive devices that include specific explosive materials, the use of the present invention is not limited to these explosive materials. By way of non-limiting example, the explosive device is an IED, an unmanned aerial vehicle ("UAV") containing the explosive device, or other apparatus containing the explosive material. As fabricated, the explosive device, or at least the receiver, may lack shielding from electromagnetic radiation.

The explosive device may be capable of being triggered from a remote location using the detonation device, which transmits electromagnetic radiation. The detonation device may transmit electromagnetic radiation having a frequency of from approximately 30 MHz to approximately 3 GHz. The detonation device may include, but is not limited to, a cellular phone, a cordless phone, a pager, a garage door opener, a car alarm, a remote control model car controller, a remote control model airplane controller, a two way radio, a television remote control, a wireless door bell device transmitter, a baby monitor, or other device configured for selective transmission of an electromagnetic radiation signal. Car alarms and garage door openers typically have operating frequencies of approximately 40 MHz. Cordless phones typically have operating frequencies of from approximately 40 MHz to approximately 50 MHz. Baby monitors typically have operating frequencies of approximately 49 MHz. Remote control airplane and car controllers typically have operating frequencies of approximately 72 MHz. Cellular phones typically have operating frequencies of from approximately 824 MHz to approximately 849 MHz. Television remote controls typically have operating frequencies of from approximately 174 MHz to approximately 220 MHz.

The conductive foam employed in an embodiment of the invention is a material that includes at least one polymeric material and at least one conductive material. The polymeric material may be a hydrocarbon-based polymer that is formulated to form a foam when dispensed from the dispensing device and to maintain the conductive material in a substantially homogeneous state in the conductive foam. In addition, the polymeric material may be non-reactive and compatible with other ingredients of the conductive foam. The conductive material may be a material that is opaque to the electromagnetic radiation emitted by the detonation device. As such, the conductive material may prevent the electromagnetic radiation emitted by the detonation device from being received by the receiver of the explosive device.

Polymeric materials that are capable of foaming are known in the art. The polymeric material may be a thermoplastic resin, a thermoset resin, or combinations thereof. The polymeric material may be a so-called "one-part polymer" or a so-called "two-part polymer." If the polymeric material is a two-part polymer, the polymeric material may be formed as a reaction product of at least one polyol and at least one curing agent. Polyols and curing agents are commercially available, or may be synthesized by conventional techniques known to those of ordinary skill in the art, which are not described herein. The polyol and the curing agent may be reacted by conventional techniques, which are not described herein. As described in more detail below, a polyol solution and a curing agent solution may be combined to initiate the polymerization reaction. While the polyol and the curing agent are referred to herein as being solutions, in actuality, each of the polyol solution and the curing agent solution may be a solution, dispersion, suspension, or colloid of the ingredients.

The polyol may have at least two hydroxyl functional groups and may include, but is not limited to, an acrylonitrile-butadiene-styrene, a butanediol, a dimethylol propionic acid, an epoxy, an ethylene glycol, an ethylene propylene diene monomer ("EPDM"), an ethylene propylene rubber ("EPR"), a fluorinated ethylene propylene, a glycerol, a hydroxy-terminated polybutadiene ("HTPB"), a hydroxy-terminated isobutylene, a pentanediol, a phenol-formaldehyde, a polyacetal, a polyacrylonitrile, a polyacrylic, a polyamide, a polyamideimide, a polyarylate, a polyarylsulfone, a polybutadiene, a polybutylene ether glycol, a polybutylene glycol, a polybutylene terephthalate, a polycarbonate, a polychloroprene, a polychlorotrifluoroethylene, a polyester, a polyether, a polyetherimide, a polyetherketone, a polyether etherketone, a polyether ketone ketone, a polyethersulfone, a polyethyl acrylate, a polyethylene, a polyethylene ether glycol, a polyethylene glycol, a polyglycidol adipate, a polylactone, a polyethylene terephthalate, a polyisoprene, a polymethyl methacrylate, a polyolefin, a polyphenylene sulfide, a polypropylene, a polypropylene glycol, a polypropylene ether glycol, a polysulfone, a polystyrene, a poly(α-methyl styrene), a polytetrafluoroethylene, a polytetrahydrofuran, a polyurethane, a polyvinyl, a polyvinyl alcohol, a polyvinyl chloride, a polyvinyl acetate, a polyvinyl fluoride, a polyvinylidene fluoride, a propanediol, a styrene acrylonitrile, a styrene butadiene, a natural rubber, a synthetic rubber, a phenolic, a silicone, a urea-formaldehyde, or combinations thereof. In one embodiment, the polyol is HTPB. In another embodiment, the polyol is 1,4-butanediol. In yet another embodiment, the polyol is polyethylene glycol.

The curing agent may be an isocyanate compound having at least two isocyanate functional groups that are capable of reacting with the hydroxyl functional groups of the polyol. The isocyanate compound may be an aliphatic, cycloaliphatic, araliphatic, aromatic, or heterocyclic isocyanate. In addition, more than one isocyanate compound may be used. Isocyanate compounds are known in the art and include, but are not limited to, dimeryl diisocyanate, hexamethylene diisocyanate ("HMDI"), isophorone diisocyanate ("IPDI"), diphenylmethane diisocyanate ("PMDI"), methylene diphenyl diisocyanate ("MDI"), phenylene diisocyanate, polymeric methylene diphenyl diisocyanate ("polymeric MDI"), polymethylene polyphenyl diisocyanate ("PAPI"), toluene diisocyanate ("TDI"), meta-tetramethylenexylene diisocyanate, tetramethylene diisocyanate, octamethylene diisocyanate, decamethylene diisocyanate, 1,2-, 1,3-, and 1,4-cyclohexane diisocyanate, 2,4- and 2,6-methylcyclohexane diisocyanate, 4,4'- and 2,4'-dicyclohexyl-diisocyanate, 4,4'- and 2,4'-dicyclohexylmethane diisocyanate, 1,3,5-cyclohexane triisocyanate, saturated (hydrogenated) polymethylene polyphenyl polyisocyanate, isocyanatomethylcyclohexane isocyanate, isocyanatoethyl-cyclohexane isocyanate, bis(isocyanatomethyl)-cyclohexane diisocyanate, 4,4'- and 2,4'-bis(isocyanatomethyl)dicyclohexane diisocyanate, 1,2-, 1,3-, and 1,4-phenylene diisocyanate, 2,4- and 2,6-toluene diisocyanate, 2,4'-, 4,4'-, and 2,2-biphenyl diisocyanate, 2,2'-, 2,4'-, and 4,4'-diphenylmethane diisocyanate, 1,2-, 1,3-, and 1,4-xylylene diisocyanate. The isocyanate compound may also be a multifunctional isocyanate, such as DESMODUR® N-100, available from Bayer MaterialScience AG. An organic isocyanate containing at least one heteroatom may also be utilized as the curing agent, such as a compound derived from melamine. In addition, a modified polyisocyanate, such as a carbodiimide or isocyanurate may be used as the curing agent.

The above-mentioned polyols and curing agents may be in a liquid state at a temperature at which the polymerization reaction is conducted. As such, the polyol solution and the curing agent solution may include the polyol and the curing agent, respectively. To form the polymeric material, the polyol solution and the curing agent solution may be combined, initiating polymerization and crosslinking of the polyol. To improve polymerization and crosslinking, a cure catalyst may be used. The cure catalyst may be an organo-tin compound, an organo-bismuth compound, an organo-ferric compound, or combinations thereof. The organo-tin compound may include, but is not limited to, dibutyl tin dilaurate, dibutyl tin diacetate, dimethyl-hydroxy(oleate) tin, dioctyl tin dilaurate, tributyl tin chloride, triphenyl tin chloride, dibutyl tin acetate, and dibutyl tin oxide. The organo-bismuth compound may include, but is not limited to, triphenyl bismuth, trioctoate bismuth, and tri(2-ethyl hexanoate bismuth). An example of the organo-ferric compound is ferric acetylacetonate.

The conductive material may be at least one carbon material, at least one metallic material, at least one conductive polymer, or combinations thereof. The conductive material may be used in any form, such as particles, spheres, beads, powder, fibers, whiskers, flakes, nanotubes, wool like structures, or combinations thereof. The dimensions of the conductive material, such as particle size, length, width, or diameter, may be altered to affect desirable properties of the conductive foam. As such, the dimensions of the conductive material may be selected based on the intended use of the conductive foam, for example, the electromagnetic frequencies sought to be blocked.

By way of non-limiting example, a suitable carbon material may be a conductive carbon black, such as lamp black, channel black, gas furnace black, oil furnace black, or thermal black. The conductive carbon black may have an average particle size of less than approximately 1 µm. In one embodiment, the conductive carbon black is a furnace black. Conductive carbon black is commercially available from numerous sources including, but not limited to, Cabot Corp. (Billerica, Mass.) under the VULCAN® tradename. In one embodiment, the conductive carbon black is VULCAN® XC72 or VULCAN® XC72R. Alternatively, the carbon material may be graphite or vapor grown carbon nanofibers. Graphite is commercially available from numerous sources including, but not limited to, Sigma-Aldrich Co. (St Louis, Mo.). The carbon material may also be derivatized, such as including oxygen-containing groups, amide groups, sulfhydryl, amino, or imino groups. The oxygen-containing groups may include, but are not limited to, carbonyl, carboxylic acid, carboxylic acid ester, epoxy, vinyl ester, hydroxy, alkoxy, or isocyanate groups. While other conductive materials may be used in the conductive foam, use of a carbon material may provide weight savings to the conductive foam.

If the conductive material is a metallic material, the conductive material may be an elemental metal including, but not limited to silver, copper, nickel, iron, aluminum, gold, platinum, palladium, mica, or combinations thereof. The metallic material may also be a metal oxide, such as tin oxide, indium tin oxide, or combinations thereof. The metallic material may also be a metal-coated or metal-plated material, such as a metal-plated metal (silver-plated copper), metal-coated ceramic, metal-coated glass, metal-plated carbon material (nickel-plated carbon fibers), or combinations thereof, or may be a metal alloy. If the conductive material is a conductive polymer, the conductive material may include, but is not limited to, polyacrlonitrile ("PAN"), polyaniline, polypyrrole, polythiophene, or combinations thereof.

Each of the conductive material and the cure catalyst may be incorporated into either or both of the polyol solution or the curing agent solution. A physical foaming agent or chemical foaming agent (collectively referred to herein as a "foaming agent") may also be incorporated into either or both of the polyol solution or the curing agent solution. The foaming agent may be selected based on the desired properties of the conductive foam, such as the density, the rate at which the conductive foam is dispensed from the dispensing device, or the expansion rate of the foam. In addition to foaming the polymeric material, the foaming agent may be used to dispense the polyol solution and the curing agent solution from the dispensing device. If a physical foaming agent is used, the foaming agent may be dissolved in at least one of the polyol solution and the curing agent solution and may expand volumetrically (at a predetermined temperature/pressure) to produce the conductive foam. If the foaming agent is a chemical foaming agent, the foaming agent may undergo a chemical change, such as a chemical reaction, with an ingredient of the polyol solution or the curing agent solution (at a predetermined temperature/pressure) to produce a gas, which produces the conductive foam. By way of non-limiting example, the chemical foaming agent may undergo a chemical decomposition reaction that produces at least one gas.

The foaming agent may be water, at least one organic solvent, at least one gas, at least one gas-liberating compound, or combinations thereof. If an organic solvent is used as the foaming agent, the organic solvent may have a boiling point of between about −50° C. and about 100° C. The organic solvent may be an alcohol, an ether, a ketone, a fluorocarbon, a halo fluorocarbon, a chlorofluorocarbon, a halo chlorofluorocarbon, a halo fluoroether, a hydro chlorofluorocarbon, a hydrocarbon, or combinations thereof The organic solvent may be acetylene, ammonia, butadiene, n-butane, i-butane, butene, isobutane, isobutylene, dimethylamine, propane, dimethylpropane, ethane, ethylamine, methane, monomethylamine, trimethylamine, n-pentane, i-pentane, cyclopentane, hexane, propane, propylene, toluene, or combinations thereof. Alternatively, the organic solvent may be a halogenated derivative of methane, ethane, propane, butane, or propane, such as methyl fluoride, methyl chloride, difluoromethane, methylene chloride, methylene bromide, perfluoromethane, trichloromethane, trifluoromethane, fluorochloromethane, trifluoroiodomethane, bromotrifluoromethane, bromochloromethane, dibromomethane, bromochloromethane, bromochlorodifluoromethane, difluorochloromethane, dichlorofluoromethane, dichlorodifluoromethane, trifluorochloromethane, trichlorofluoromethane, ethyl fluoride, ethyl chloride, difluoroethane, trifluoroethane, 1,1,1-trichloro-2,2,2-trifluoroethane, 1-fluoro-1-dichloro-2-difluoro-2-chloroethane, 1-difluoro-1-chloro-2-difluoro-2-chloroethane, 1-chloro-1-fluoro-2,2,2-trifluoroethane, 1-fluoro-2,2,2-trifluoroethane, 1,1-difluoro-1-chloroethane, 1-dichloro-2-trifluoroethane, 1-fluoro-1-chloro-2-difluoro-2-chloroethane, 1,1-difluoroethane, 1,1,2-trichloro-1,2,2-trifluoroethane, 1,1,2,2-tetrafluoroethane, 1,1,1,2-tetrafluoroethane, 1,2-dichloro-1,1,2,2-tetrafluoroethane, 1,1,2,2,2-pentafluoroethane, 1-chloro-1,1,2,2,2-pentafluoroethane, 2-chloro-1,1,1,2-tetrafluoroethane, 2,2,2-trifluoro-1,1-dichloroethane ("HCFC-123"), 1,1,1-trichloroethane, carbon tetrachloride, carbon tetrafluoride, difluorotetrachloroethane, 1,1-dichloro-1-fluoroethane ("HCFC-141b"), 1,1-difluoro-1-chloroethane ("HCFC-142b"), hexachloroethane, dichlorotetrafluoroethane ("CFC- 114"), chlorotrifluoroethane, trichlorotrifluoroethane ("CFC-113"), 1-chloro-1,2,2,2-tetrafluoroethane ("HCFC-124"), 1,1-difluoroethane ("HFC-152a"), 1,1,1-trifluoroethane ("HFC-143a"), 1,1,1,2-tetrafluoroethane ("HFC-134a"), perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, 1,1-dichloro-2,2,2-trifluoroethane, monochlorodifluoromethane, 1-chloro-1,1-difluoroethane, 1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, or combinations thereof.

If the foaming agent is gaseous, the foaming agent may be gaseous at ambient temperature and pressure conditions, or gaseous at the temperature and pressure conditions present in the dispensing device. The gas may be nitrogen ("$N_2$"), oxygen ("$O_2$"), carbon dioxide ("$CO_2$"), air, argon, neon, helium, a fluorocarbon material, or combinations thereof. If a gas-liberating compound is used as the foaming agent, the gas-liberating compound may decompose at a temperature between approximately 130° C. and approximately 350° C. to form a gas, such as $N_2$, $CO_2$, or carbon monoxide ("CO"). The gas-liberating compound may include, but is not limited to, ammonium carbonate, sodium bicarbonate, sulfonyl hydrazide, azodicarbonamide, p,p'-oxybis(benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, or combinations thereof.

Additional ingredients may, optionally, be used to provide desirable properties to the foam-generating composition or the conductive foam. By way of non-limiting example, the optional ingredient(s) may include at least one of a surfactant, a processing aid, a viscosity reducer, a flame retardant, a dispersing agent, a reinforcing agent, a plasticizer, a stabilizer, a filler, a pigment, and a compatibility agent. The additional ingredients, if present, may be incorporated into either or both of the polyol solution or into the curing agent solution before forming the polymeric material.

Since the polyol and the curing agent are reactive, the polyol solution and the curing agent solution may be stored separately in the dispensing device until initiation of the polymerization reaction is desired. As previously mentioned, at least one of the polyol solution and the curing agent solution may include at least one of the conductive material, the cure catalyst, the foaming agent, and any additional ingredients (if present). By way of non-limiting example, the polyol solution may include the polyol, the conductive material, the cure catalyst, and the foaming agent, while the curing agent solution includes the curing agent. Alternatively, the foaming agent may be present in the curing agent solution. The order of adding the conductive material, cure catalyst, and foaming agent to the polyol solution is not critical as long as the resulting polyol solution includes a homogenous dispersion of these ingredients. The ingredients may be added to the polyol solution using conventional techniques and conventional processing equipment. By way of non-limiting example, the conductive material may be added to, and homogeneously dispersed in, the polyol solution. The cure catalyst may then be homogeneously dispersed in the polyol solution containing the polyol and conductive material. The foaming agent may then be homogeneously dispersed in the polyol solution containing the polyol, conductive material, and cure catalyst. The conductive material, cure catalyst, and foaming agent may also be simultaneously added to the polyol solution, as long as these ingredients are homogeneously dispersed in the polyol solution.

When polymerization and crosslinking is desired, the polyol solution and the curing agent solution are combined, forming a foam-generating composition. The foam-generating composition may include from approximately 10% by weight ("wt %") to approximately 65 wt % of the conductive material, such as from approximately 20 wt % to approximately 55% by weight of the conductive material. The foam-generating composition may include from approximately 1 wt % to approximately 20 wt % of the polyol and from approximately 0.01 wt % to approximately 1 wt % of the cure catalyst. The curing agent may be present in the foam-generating composition at from approximately 30 wt % to approximately 70 wt %. The foaming agent may be present in the foam-generating composition in an amount sufficient to produce a conductive foam exhibiting a desired density. If a physical foaming agent is used, the density of the conductive foam may depend on the solubility of the physical foaming agent in the foam-generating composition. If the foaming agent is a chemical foaming agent, the density of the conductive foam may depend upon the amount of the chemical foaming agent present in the foam-generating composition. The foaming agent may be present in the foam-generating composition at from approximately 30 wt % to approximately 90 wt %, such as from approximately 60 wt % to approximately 80 wt %. By way of non-limiting example, the conductive foam may have a density within a range of from approximately 80 mg/cm$^3$ to approximately 1 g/cm$^3$.

The polyol solution and the curing agent solution may be stored separately, under pressure, in the dispensing device. To form the conductive foam, the polyol solution and the curing agent solution may be combined and released from the dispensing device. By way of non-limiting example, the curing agent solution may be rapidly dispersed into the polyol solution containing the polyol, conductive material, cure catalyst, and foaming agent, such as within from approximately 30 seconds to approximately 60 seconds. Upon combination of the polyol solution and the curing agent solution, polymerization and crosslinking of the polyol occurs. The polymerization reaction is exothermic and the heat generated by the reaction may be used to volatilize the foaming agent. In addition, release of the foam-generating composition from the dispensing device to atmospheric pressure provides additional volatilization or gasification of the foaming agent. Gasification of the foaming agent produces cells or so-called "bubbles" in the foam-generating composition as the polyol polymerizes into the polymeric material. The cells may cause the polymerizing polyol to expand.

After polymerization and crosslinking of the polyol and foaming of the polymeric material, the conductive foam may include the conductive material homogeneously dispersed in the polymeric material. Depending on the foaming agent used, the conductive foam may also include voids or spaces produced by the foaming agent, or bubbles of gas, such as $N_2$, CO, $CO_2$, air, argon, neon, helium, a fluorocarbon material, or combinations thereof The conductive material may be present in the conductive foam in an amount sufficient to prevent electromagnetic radiation from substantially penetrating the conductive foam. As used herein, "substantial" penetration of the conductive foam by the electromagnetic radiation may be defined as penetration with a signal strength sufficient to initiate the explosive device via its receiver. The conductive material may account for from approximately 10 wt % to approximately 70 wt % of the conductive foam, such as from approximately 20 wt % to approximately 40 wt %. The polymeric material may account for from approximately 30 wt % to approximately 90 wt % of the conductive foam, such as from approximately 60 wt % to approximately 80 wt %.

The dispensing device may include a spray gun or other device capable of maintaining the polyol solution and the curing agent solution under pressure and dispensing the foam-generating composition to produce the conductive foam. The dispensing device may include a rupturable reservoir, conduit, and a delivery orifice. The rupturable reservoir may be disposed between walls of the dispensing device and may be of appropriate dimensions to store the polyol solution and the curing agent solution. The rupturable reservoir may include at least two compartments for separately storing the polyol solution and the curing agent solution. The two compartments of the rupturable reservoir may be operably coupled to the delivery orifice by conduit. The conduit may enable combination of the polyol solution and the curing agent solution before the foam-generating composition exits the dispensing device. The delivery orifice may be configured to dispense the foam-generating composition as a desired stream, such as in a thin stream or as a wide stream, such as a sheet stream.

The dispensing device may be a portable device, such as a backpack or shoulder-held device capable of generating and dispensing the foam-generating composition. Alternatively, a munition, such as a warhead or other projectile, may be configured to include the dispensing device. The dispensing device may be configured for dispensing the foam-generating composition at a distance of from approximately 6 inches to approximately 35 feet away from the explosive device. Since the viscosity of the foam-generating composition increases as the foam-generating composition is released to ambient pressure, the dispensing device may be configured for delivering the foam-generating composition without clogging the delivery orifice or conduit. Since the viscosity of the foam-generating composition also depends on the temperature of an environment in which the dispensing device is used, the dispensing device may include at least one of a heating unit or a cooling unit to maintain the foam-generating composition at a desired viscosity for delivery. The foam-generating composition may be dispensed into an environment having a temperature within a range of from approximately −30° C. to approximately 60° C. Dispensing devices are known to those of ordinary skill in the art and, therefore, are not described in detail herein.

The polyol solution and the curing agent solution may come into contact in the conduit, enabling polymerization of the polyol and foaming of the resulting polymeric material. The foam-generating composition may be dispensed from the dispensing device in a single shot or in multiple shots. During application, substantial homogeneity of the conductive material in the foam-generating composition may be maintained. To maintain the substantial homogeneity of the conductive material in the foam-generating composition, the dispensing device may be agitated before dispensing the foam-generating composition.

When a suspicious explosive device is identified by military or law enforcement personnel, the foam-generating composition may be dispensed from the dispensing device by an operator or by an automated system. By way of non-limiting example, the automated system may be a robotic system. Alternatively, the foam-generating composition and the dispensing device may be incorporated into a munition that comes into proximity with the explosive device. When the explosive device is identified as such by the munition, the foam-generating composition may be dispensed from the dispensing device and onto the explosive device. Since the conductive foam may be applied to the explosive device from a distance, an operator of the dispensing device may be positioned a relatively safe distance from the explosive device. Upon polymerization and foaming of the foam-generating composition, the conductive foam may cover or coat the explosive device, substantially encasing the explosive device with the conductive foam. As used herein, the term "substantially encasing," or grammatical equivalents thereof, means and includes covering or coating exposed surfaces of the explosive device with the conductive foam. Any nonexposed surface(s) of the explosive device, such as the surface(s) upon which the explosive device is placed, may be substantially free of the conductive foam because electromagnetic radiation emitted from the detonation device may not penetrate the explosive device through these nonexposed surface(s). The conductive foam may adhere to the exposed surfaces of the explosive device and also to a portion of the surface upon which the explosive device is located. By way of non-limiting example, if the explosive device is located on a surface of a dirt, concrete, asphalt, or other material, the conductive foam may adhere to a portion of this material such that the explosive device is substantially encased with the conductive foam.

The conductive foam may also be applied to, and adhered to, exposed surfaces of the object in which the explosive device is concealed. By way of non-limiting example, if the explosive device is concealed in a backpack or other luggage, a box or other container, or an animal carcass, the conductive foam may be applied to the exposed surfaces of the concealing object. The conductive foam may substantially encase the object in which the explosive device is concealed. In this situation, the term "substantially encase," or grammatical equivalents thereof, means and includes covering or coating exposed surfaces of the concealing object with the conductive foam. Nonexposed surface(s) of the concealing object, such as the surface(s) upon which the concealing object is placed, may be substantially free of the conductive foam because electromagnetic radiation emitted from the detonation device may not penetrate the concealing object and the explosive device through these surface(s). The conductive foam may also be applied to exposed surfaces of dirt, asphalt, concrete, or other materials, such as paving or structural materials, if the explosive device is buried or concealed in such a material. For instance, the conductive foam may be applied to exposed surfaces of the material in which the explosive device is buried or concealed.

When released to ambient pressure, the foam-generating composition may expand to greater than approximately three times its volume compared to the volume when stored in the dispensing device. As shown in FIG. 1, the conductive foam 2 may cure or otherwise substantially harden, forming a rigid casing or coating over the explosive device 4. The illustrations presented herein are not meant to be actual views of any particular explosive device 4, but are merely idealized representations which are employed to describe the present invention. The conductive material 6 may be substantially homogenously or uniformly dispersed in the polymeric material 8 of the conductive foam 2. The conductive foam 2 may prevent the explosive device 4 from detonating by disrupting communication between the receiver of the explosive device 4 and the detonation device 9. Without being bound to a particular theory, it is believed that the conductivity of the conductive foam 2 may prevent actuation of the explosive device 4. The conductive foam 2 may function as a Faraday cage to prevent the explosive device 4 from receiving the electromagnetic radiation signal emitted by the transmitter of the detonation device 9.

Figure 2:
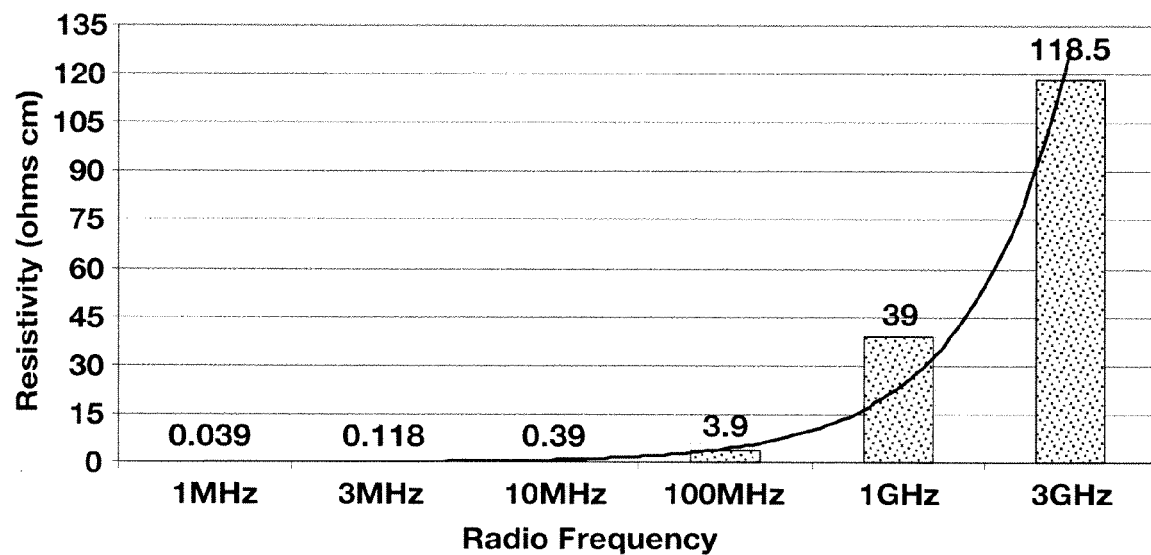
FIG. 2 is a graph illustrating the predicted volume resistivity (ohms cm) of a conductive foam for a skin depth of 1 cm needed to disrupt a particular radiofrequency (MHz or GHz) of electromagnetic radiation.

The conductive foam 2 may be formed on the explosive device 4 at a sufficient thickness to prevent electromagnetic radiation transmitted from the detonation device from actuating the explosive device 4. The thickness of the conductive foam 2 may depend on the volume resistivity of the conductive foam 2 and the operating frequency of the detonation device. FIG. 2 graphically illustrates the predicted volume resistivity (ohms cm) of a conductive foam 2 for a skin depth of 1 cm needed to disrupt a particular radiofrequency (MHz or GHz) of electromagnetic radiation. The skin depth is the depth into the conductive foam 2 that the strength or magnitude of the electromagnetic radiation decreases by a factor of 1/e of its original value, where e is equal to 2.72. As shown in FIG. 2, a conductive foam 2 having a volume resistivity of 0.039 ohm cm disrupts an operating frequency of 1 MHz, a volume resistivity of 0.118 ohm cm disrupts an operating frequency of 3 MHz, a volume resistivity of 0.39 ohm cm disrupts an operating frequency of 10 MHz, a volume resistivity of 3.9 ohms cm disrupts an operating frequency of 100 MHz, a volume resistivity of 39 ohms cm disrupts an operating frequency of 1 GHz, and a volume resistivity of 118.5 ohms cm disrupts an operating frequency of 3 GHz.

The following examples serve to further explain embodiments of the present invention in more detail. These examples are not to be construed as being exhaustive, exclusive, or otherwise limiting as to the scope of this invention.

EXAMPLE 1

Conductive Foam Including Conductive Carbon and Polyurethane

A conductive foam including conductive carbon black and polyurethane was produced by preparing a first solution of 1,4-butanediol, conductive carbon, dibutyl tin diacetate, and methylene chloride. The conductive carbon was VULCAN® XC72R. A second solution of DESMODUR® N-100 was rapidly mixed with the first solution. The resulting foam-generating composition included 20% conductive carbon, 14.7 wt % 1,4-butanediol, 65.29 wt % DESMODUR® N-100, 0.01 wt % dibutyl tin diacetate, and 9.0 wt % methylene chloride. Heat generated by the polymerization reaction produced volatilization of the methylene chloride, expanding the 1,4-butanediol as the 1,4-butanediol crosslinked. The conductive foam included 21% conductive carbon black and 79% polyurethane (the reaction product of the DESMODUR® N-100 and the 1,4-butanediol).

EXAMPLE 2

Conductive Foam Including Conductive Graphite and Polyurethane

A conductive foam including conductive graphite flake and polyurethane was produced by preparing a first solution of 1,4-butanediol, conductive graphite flake, dibutyl tin diacetate, and methylene chloride. A second solution of PAPI was rapidly mixed with the first solution. The resulting foam-generating composition included 45% conductive graphite flake, 2.9 wt % 1,4-butanediol, 43 wt % PAPI, 0.1 wt % dibutyl tin diacetate, and 9.0 wt % methylene chloride. Heat generated by the polymerization reaction produced volatilization of the methylene chloride, expanding the 1,4-butanediol as the 1,4-butanediol crosslinked. The conductive foam included 51% conductive graphite and 49% polyurethane (the reaction product of the PAPI and the 1,4-butanediol).

EXAMPLE 3

Effect of Conductive Material on Volume Resistivity

Figure 3:
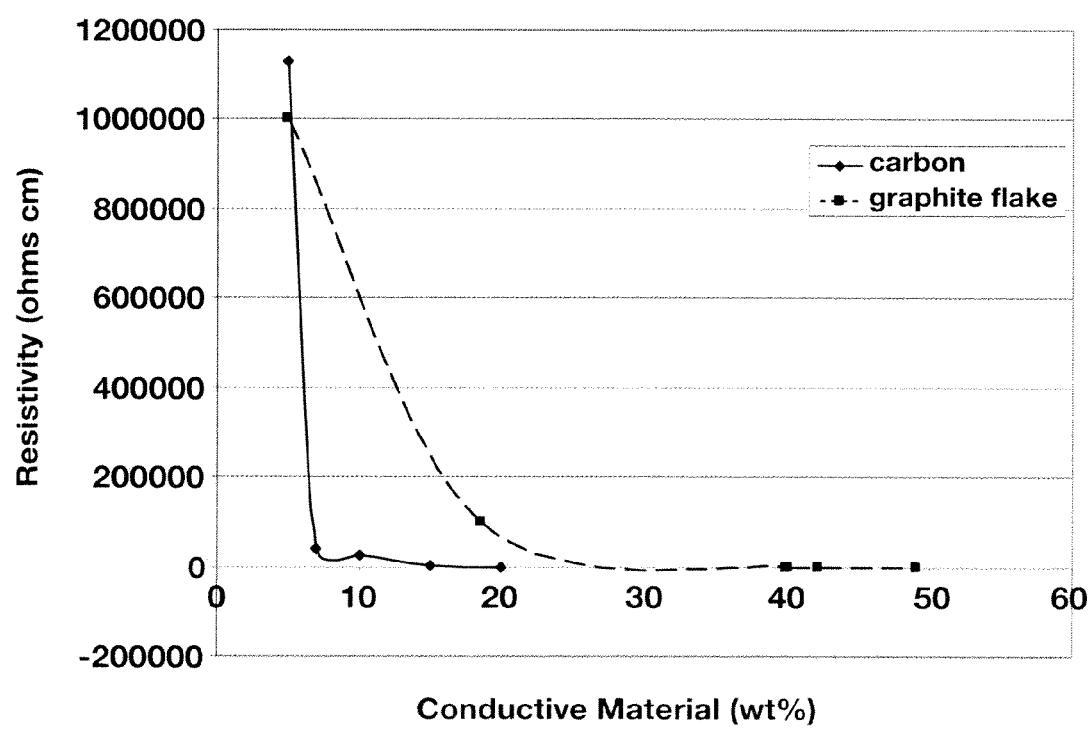
FIG. 3 is a graph illustrating the volume resistivity (ohms cm) versus the weight percentage of conductive material in a conductive foam according to the present invention.

To determine the effect of the amount of conductive material on the volume resistivity of the conductive foam, conductive foams including various amounts of conductive carbon or graphite were prepared in a manner similar to that described in Examples 1 and 2. The conductive foams were prepared from foam-generating compositions that included various loadings of the conductive carbon or of the graphite. The foam-generating composition from which the carbon-containing conductive foam was produced included the conductive carbon, DESMODUR® N-100, dibutyl tin diacetate, 1,4-butanediol, and methylene chloride. The foam-generating composition from which the graphite-containing conductive foam was produced included graphite flake, PAPI, dibutyl tin diacetate, 1,4-butanediol, and methylene chloride. Conductive foams including from approximately 15 wt % to approximately 32 wt % of conductive carbon had low volume resistivities, as shown in FIG. 3. Conductive foams including from approximately 28 wt % to approximately 50 wt % of conductive graphite also had low volume resistivities, as shown in FIG. 3.

EXAMPLE 4

Disruption of Detonation Devices

To determine the effectiveness of the conductive foam in shielding electromagnetic radiation, a wireless door bell device operating at 40 MHz was obtained. The wireless door bell device included a ringer portion comprising a receiver and an activation portion comprising a transmitter and was first confirmed to be functional before conducting additional testing. The receiver of the ringer portion of the wireless door bell device was encased in the conductive foam described in Example 1 by pouring the conductive foam onto the ringer portion. The conductive foam was approximately 0.5-0.75 inch thick and formed a rigid casing over the ringer portion. The activation portion of the wireless door bell device was positioned greater than approximately one meter from the ringer portion. When the transmitter of the wireless door bell device was actuated, the ringer portion of the wireless door bell device did not operate.

Similar testing was conducted using a cellular phone operating at 830 MHz. The cellular phone was confirmed to be functional by first placing a call to the cellular phone. The cellular phone was encased in the conductive foam described in Example 1 by pouring the conductive foam on the cellular phone. The conductive foam was approximately 0.5-0.75 inch thick and formed a rigid casing over the cellular phone. When a call was placed to the cellular phone after application of the conductive foam, the cellular phone did not operate.

EXAMPLE 5

Disruption of an IED

Figure 4:
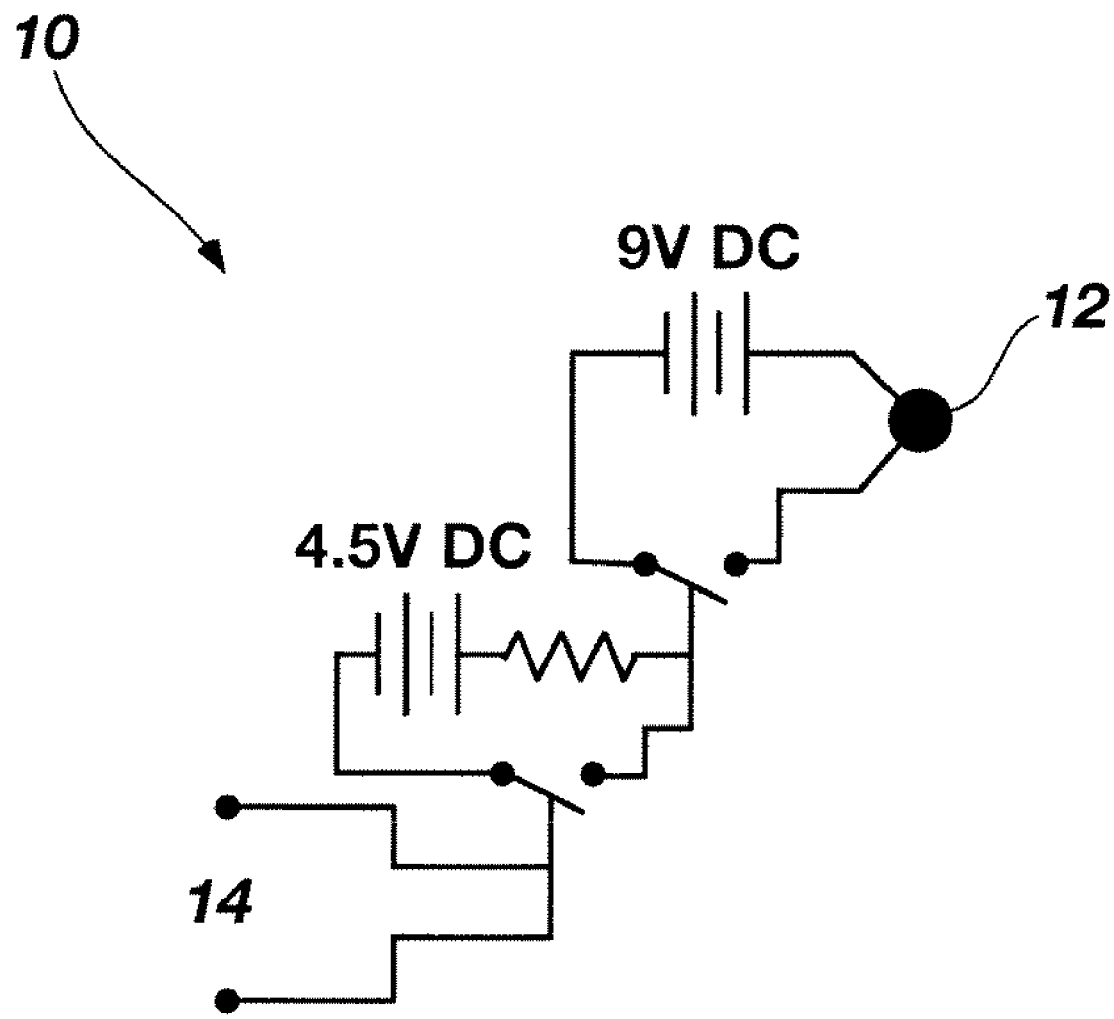
FIG. 4 is a schematic illustration of an improvised explosive device ("IED").

To determine the effectiveness of a conductive foam in shielding electromagnetic radiation, an IED including the receiver of the wireless door bell device described in Example 4, batteries, relays, and an explosive material was produced. The explosive material included lead thiocyanate, lead oxide, potassium chlorate, and potassium perchlorate. As illustrated schematically in FIG. 4, the IED 10 was configured to initiate the explosive material 12 upon actuation of the activation portion of the wireless door bell device 14 to cause the transmitter to send an electromagnetic signal. The IED 10 was confirmed to be functional before conducting additional testing. Actuation of the transmitter of the activation portion of the wireless door bell device 14 caused initiation of the explosive material 12. The conductive foam described in Example 1 was then poured onto the receiver of the wireless door bell device 14, forming a rigid casing. When the transmitter of the activation portion of the wireless door bell device 14 was actuated following deposition of the conductive foam, the explosive material 12 was not initiated by the electromagnetic signal.

EXAMPLE 6

Disruption of an IED

To determine the effectiveness of a conductive foam in shielding electromagnetic radiation, an IED was produced as described in Example 5. The IED 10 was confirmed to be functional before conducting additional testing. Actuation of the transmitter of the activation portion of the wireless door bell device 14 caused initiation of the explosive material 12. The conductive foam described in Example 2 was poured onto the ringer portion of the wireless door bell device 14, forming a rigid casing. When the transmitting portion of the wireless door bell device 14 was actuated after deposition of the conductive foam, the explosive material 12 was not initiated by the electromagnetic signal.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as encompassed by the following appended claims and their legal equivalents.

What is claimed is:

1. A method of preventing initiation of an explosive device, comprising:
    combining a polyol solution, a curing agent, and a conductive material to form a conductive foam; and
    applying the conductive foam to an explosive device configured to be initiated by an electromagnetic radiation signal emitted from a transmitter.

2. The method of claim 1, wherein applying the conductive foam to an explosive device comprises applying the conductive foam comprising polyurethane and conductive carbon to the explosive device.

3. The method of claim 1, wherein applying the conductive foam to an explosive device comprises applying the conductive foam comprising polyurethane and graphite to the explosive device.

4. The method of claim 1, wherein applying the conductive foam to an explosive device configured to be initiated by an electromagnetic radiation signal emitted from a transmitter comprises spraying the conductive foam comprising the conductive material substantially homogeneously dispersed in a polymeric material.

5. The method of claim 1, wherein combining a polyol solution, a curing agent, and a conductive material to form a conductive foam comprises combining a polyol solution comprising the conductive material dispersed therein and the curing agent to form the conductive foam.

6. A method of preventing initiation of an explosive device, comprising:
    forming a foam-generating composition comprising a conductive material, a polyol, a curing agent, a foaming agent, and a cure catalyst;
    foaming the foam-generating composition, and
    applying the foam-generating composition to an explosive device configured to be initiated by an electromagnetic radiation signal emitted from a transmitter.

7. A method of preventing initiation of an explosive device, comprising:
    applying a conductive foam formulated to disrupt passage of electromagnetic radiation in direct contact with a receiver associated with an explosive device, the explosive device configured to be initiated by an electromagnetic radiation signal emitted from a transmitter.

8. The method of claim 7, wherein applying a conductive foam formulated to disrupt passage of electromagnetic radiation in direct contact with a receiver associated with an explosive device comprises spraying the conductive foam comprising a conductive material incorporated in at least one polymeric material on to the receiver.

9. The method of claim 7, wherein applying a conductive foam formulated to disrupt passage of electromagnetic radiation in direct contact with a receiver associated with an explosive device comprises spraying the conductive foam on the receiver associated with the explosive device.

10. A method of preventing initiation of an explosive device, comprising:
    applying a conductive foam formulated to disrupt passage of electromagnetic radiation to a receiver associated with an explosive device, the explosive device configured to be initiated by an electromagnetic radiation signal emitted from a transmitter; and
    substantially encasing the receiver associated with the explosive device with the conductive foam by spraying the conductive foam on the receiver associated with the explosive device.

11. The method of claim 10, wherein substantially encasing a receiver associated with an explosive device with a conductive foam comprises covering exposed surfaces of the receiver associated with the explosive device with the conductive foam.

12. The method of claim 10, wherein substantially encasing a receiver associated with an explosive device with a conductive foam comprises substantially encasing an electromagnetic signal receiver of an improvised explosive device with the conductive foam.

13. The method of claim 10, wherein substantially encasing a receiver associated with an explosive device with a conductive foam comprises substantially encasing a receiver associated with an explosive device configured to be actuated by an electromagnetic radiation signal with the conductive foam.

14. The method of claim 10, wherein substantially encasing a receiver associated with an explosive device with a conductive foam by spraying the conductive foam on the receiver comprises spraying the conductive foam on a receiver associated with the explosive device and configured to be detonated by an electromagnetic radiation signal produced by a detonation device selected from the group consisting of a cellular phone, a cordless phone, a pager, a garage door opener, a car alarm, a remote control model car controller, a remote control model airplane controller, a two way radio, a television remote control, wireless door bell device activation portion, and a baby monitor.

15. The method of claim 10, wherein substantially encasing a receiver associated with an explosive device with a conductive foam comprises disrupting communication between the receiver associated with the explosive device and a detonation device configured for wireless initiation of the explosive device.

16. The method of claim 10, wherein substantially encasing a receiver associated with an explosive device with a conductive foam comprises substantially encasing an object in which the receiver associated with the explosive device is at least partially contained with the conductive foam.

17. A method of preventing initiation of an explosive device, comprising:
   applying a conductive foam formulated to disrupt passage of electromagnetic radiation to a receiver associated with an explosive device, the explosive device configured to be initiated by an electromagnetic radiation signal emitted from a transmitter; and
   spraying the conductive foam on at least a portion of the explosive device to disrupt communication between the receiver and a detonation device thereof, the conductive foam comprising a conductive material substantially homogeneously dispersed in a polymeric material.

18. The method of claim 17, wherein spraying a conductive foam on at least a portion of an explosive device comprises forming a foam-generating composition comprising a conductive material, a polyol, a curing agent, a foaming agent, and a cure catalyst, foaming the foam-generating composition, and spraying the foam-generating composition on the at least a portion of the explosive device.

19. The method of claim 17, wherein spraying a conductive foam on at least a portion of an explosive device to disrupt communication between a receiver and a detonation device thereof comprises directly contacting the receiver with the conductive foam.

* * * * *